United States Patent [19]
Ellis

[11] 4,118,147
[45] Oct. 3, 1978

[54] COMPOSITE REINFORCEMENT OF METALLIC AIRFOILS

[75] Inventor: Delmar H. Ellis, West Chester, Ohio

[73] Assignee: General Electric Company, Cincinnati, Ohio

[21] Appl. No.: 753,317

[22] Filed: Dec. 22, 1976

[51] Int. Cl.² .............................................. F01D 5/16
[52] U.S. Cl. .................................. 416/230; 416/500; 416/224
[58] Field of Search ................... 416/229 A, 230, 500, 416/224, 241 A, 229 R; 29/156.8 B

[56] References Cited

U.S. PATENT DOCUMENTS

| | | | |
|---|---|---|---|
| 2,412,615 | 12/1946 | Howard | 416/229 A |
| 2,809,802 | 10/1957 | Suits | 416/230 |
| 2,917,274 | 12/1959 | Davidson | 416/230 |
| 2,933,286 | 4/1960 | Klint et al. | 416/229 A X |
| 2,984,453 | 5/1961 | Heymann | 416/229 A |
| 2,999,669 | 9/1961 | McGinnis | 416/229 A |
| 3,294,366 | 12/1966 | Coplin | 416/230 X |
| 3,368,795 | 2/1968 | Bolin et al. | 416/229 |
| 3,566,493 | 3/1971 | Poucher et al. | 29/156.8 |
| 3,796,513 | 3/1974 | Jonas | 416/224 |

Primary Examiner—Everette A. Powell, Jr.
Attorney, Agent, or Firm—Robert C. Lampe, Jr.; Derek P. Lawrence

[57] ABSTRACT

A method of fabricating a turbomachinery blade is provided whereby high stress levels associated with stripe mode resonance can be avoided. Once the nodal pattern for an objectionable stripe mode resonance condition of a metallic blade is determined by conventional means, a portion of the blade parent metal near the tip is replaced with a composite patch, the composite patch comprising elongated filaments embedded in a matrix material. The chordwise extent of the patch includes the nodal points at the objectionable stripe mode resonance condition and the filament orientation is chordwise to enhance chordwise stiffness.

13 Claims, 7 Drawing Figures

U.S. Patent  Oct. 3, 1978  Sheet 1 of 2  4,118,147
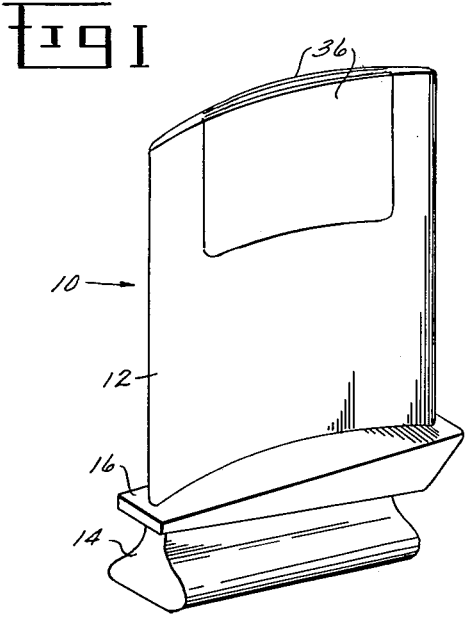
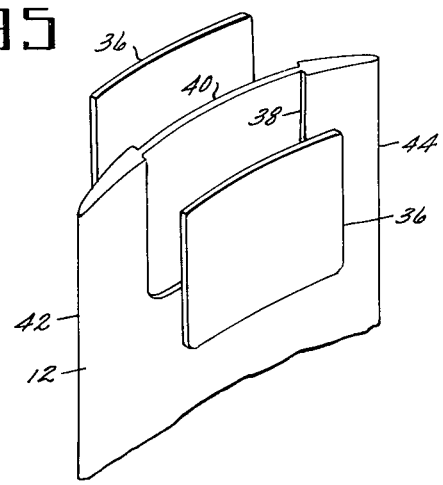
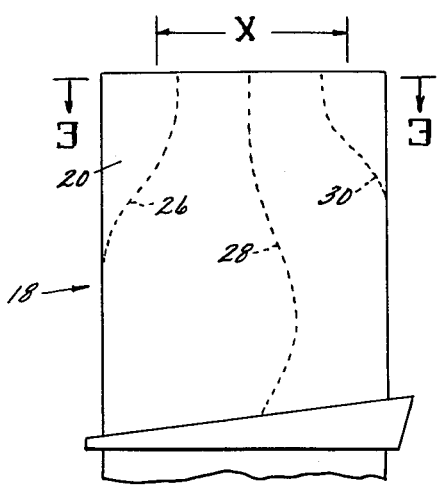
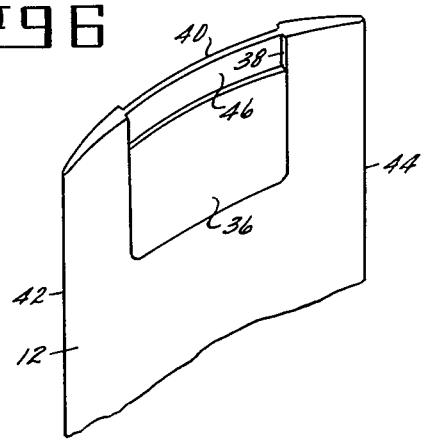
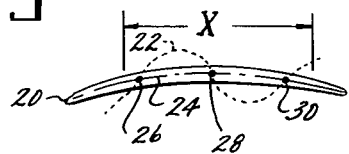
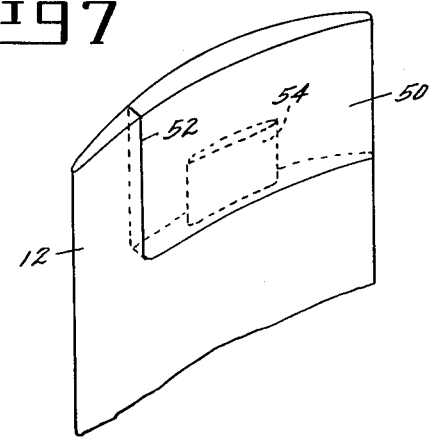

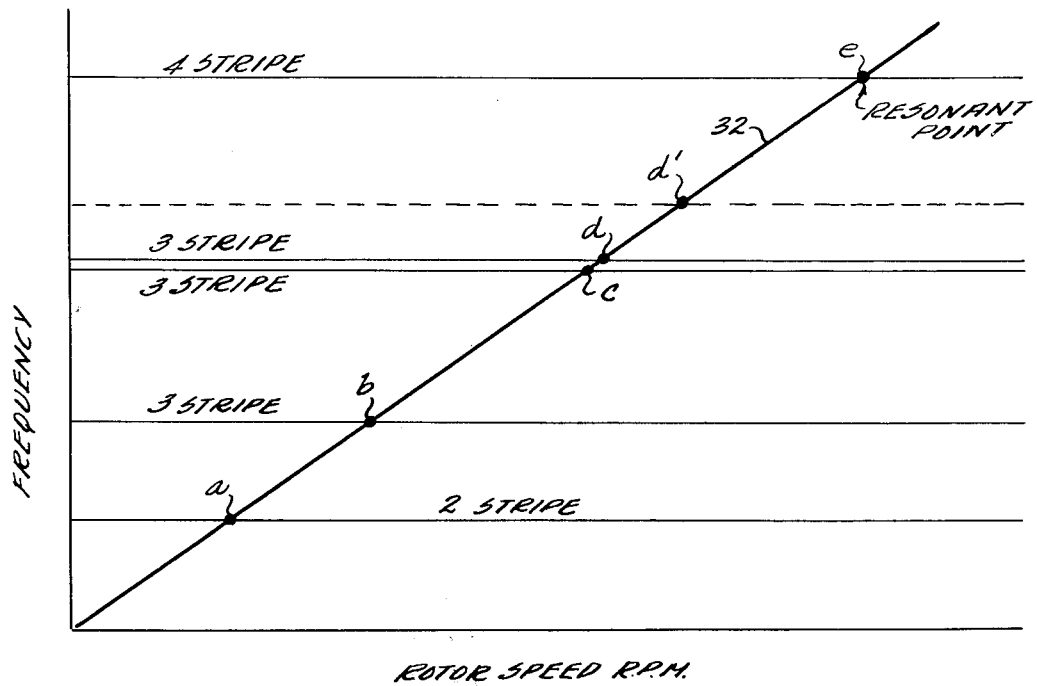

COMPOSITE REINFORCEMENT OF METALLIC AIRFOILS

BACKGROUND OF THE INVENTION

This invention relates to blades for use in fluid flow machines and, more particularly, to the use of composite materials for the prevention of high frequency stripe mode resonance in the blades of axial flow compressors.

Stripe mode resonance can present a significant problem in the design and development of gas turbine engine fan and compressor blades. Stripe mode resonance is a plate deformation vibratory mode, a high frequency resonance phenomenon associated with the aerodynamic wakes generated by rows of airfoils upstream of the blade row experiencing the stripe mode excitation. It is very local in both stress and deformation, being located primarily in the tip extremity of the blade which undergoes predominantly chordwise bending. In contrast, the low frequency modes of flexure and torsion (flutter) extend over a large portion of the blade and produce significant stresses in the lower portion of the airfoil. In the first flexural mode, the stress is primarily that of spanwise bending while in the first torsional mode, the stress is predominantly torsional shear. Thus, the stripe mode resonance problem is completely different in scope, location and mode shape than the low frequency flutter modes.

Contemporary gas turbine engine compressor and fan blade designs incorporate high stage loading, low aspect ratio airfoils which inherently incur stripe mode resonance which can become a significant problem when the vibratory modes cross airfoil passing frequencies at high speeds and energies. The passing frequencies are the rotational wave frequencies produced by the upstream blade wakes and are the product of airfoil relative velocity times the number of wakes. The cross over, or resonant, condition often produces high cycle fatigue with subsequent airfoil fragmentation, usually across the blade corners at the tip.

Although not as spectacular a vibratory mode or as well publicized as airfoil flutter, the stripe mode resonance has required redesign of many, if not most, modern compressors during their development phases. Due to its high frequency nature, stripe mode resonance is not precisely predictable by current design analysis. Also, many modes occur in the passing frequency spectrums of engine operation and elimination of all such resonances by design is inpractical. Therefore, elimination of those few resonances which development testing discloses to be dangerous is normally provided by design modifications during engine optimization, not by initial design. One modification which has been widely adopted is to cut back the airfoil tip corners to temporarily control a fatigue limiting stripe mode. In other instances, elimination of the stripe mode resonance has required substituting a new inlet guide vane airfoil row having a reduced number of airfoils to eliminate frequency cross-over in the engine operating range. Airfoil thickness increase has also been incorporated in the rotor blades to increase blade frequency so as to move the cross-over resonance to an engine speed above the engine operating range. Such design modifications, although effective, are cost consuming and can potentially delay early engine development if immediate temporary measures are unavailable. Thus, a more effective method of eliminating stripe mode problems is required by the gas turbine engine design community.

It has also been recognized that composite materials offer potential for design improvement in gas turbine engines and their adoption in various engine components has been actively pursued for several years. In particular, numerous attempts have been made to replace the relatively heavy metal blades with blades fabricated essentially entirely of composite materials, particularly in aircraft engine applications where engine weight is a critical design parameter. Composite material technologies have become quite sophisticated and diversified since the early efforts involving glass fibers. Recent efforts have been directed toward the utilization of boron, graphite and other synthetic high strength filaments embedded in lightweight matrices. However, the fact that composite airfoils for gas turbine engines have not been universally employed attests to the difficulty of adapting composite material to this sophisticated technology. Thus, it is also desirable to take advantage of the potential composite materials in the design of improved fan and compressor blades.

SUMMARY OF THE INVENTION

Accordingly, it is the primary object of the present invention to provide an improved yet simple means for reducing the stripe mode resonant problem on gas turbine engine fans and compressors.

It is another object of the present invention to eliminate this stripe mode resonance problem by taking advantage of composite material technology.

It is yet another object of the present invention to provide an improved method of reducing stripe mode resonance in generally cast metallic blades through reinforcement by composite materials of preferred filament orientation.

It is still another object of the present invention to provide a method for fabricating a blade free from objectionable stripe mode resonance.

These and other objects and advantages will be more clearly understood from the following detailed description, drawings and specific examples, all of which are intended to be typical of rather than in any way limiting on the scope of the present invention.

Briefly stated, the above objects are accomplished by testing a generally metallic blade by known means to determine the blade nodal patterns and natural vibratory frequencies. Those resonant points which a skilled aeromechanical designer would find objectionable are then selected. The blade is then machined or etched to remove a portion of the metallic airfoil panels at the tip, the removed portion including the nodal points as previously determined. Subsequent blades would be manufactured with the required portion eliminated during the initial forging process. The pockets thus formed by such processes are then filled with patches of composite materials including high strength, collimated filaments embedded in a preferably metallic matrix. The filaments are oriented in a generally chordwise direction to enhance chordwise stiffness and, thus, eliminate the objectionable stripe modes. For ease of fabrication, the pockets may extend to the blade tips. Additionally, the patch inserts may include temporary, radially-oriented extensions to permit mechanical clamping during the process of bonding the patches to the blades. These extensions can be removed by machining following bonding.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a perspective view of a gas turbine engine blade embodying the present invention;

FIG. 2 is an illustrative view of a gas turbine engine rotor blade undergoing stripe mode resonance showing the location of various nodal lines;

FIG. 3 is a cross-sectional view taken along line 3—3 of FIG. 2 depicting in exaggerated form the vibratory displacement of the blade mean camber line;

FIG. 4 is a Campbell diagram for a blade such as that of FIGS. 2 and 3 depicting the resonant points in various stripe modes;

FIG. 5 is an enlarged, exploded view of the tip of the blade of FIG. 1 depicting the subject invention in greater detail;

FIG. 6 is a perspective view of the tip portion of the blade of FIG. 1 showing an alternative embodiment of the present invention; and FIG. 7 is a view, similar to FIG. 6, and depicting yet another embodiment of the subject invention.

DESCRIPTION OF THE PREFERRED EMBODIMENT

Referring to the drawings wherein like numerals correspond to like elements throughout, reference is first directed to FIG. 1 wherein a gas turbomachinery blade depicted generally at 10 and constructed according to the present invention is diagrammatically shown. While not intended to be so limiting, blade 10 is of the type adapted for use in axial flow gas turbine engines and fans. It will become apparent to those skilled in the art that the present invention offers an improvement for many structures and that blade 10 is merely meant to be illustrative of one such application. Accordingly, blade 10 is shown to comprise an airfoil portion 12 of generally radially variant camber and stagger and a dovetail tang 14 which enables the blade to be mounted on and retained by a rotatable disc or hub in the usual manner of a gas turbine engine compressor or fan. A flow path defining platform 16 extends laterally of the airfoil portion between the airfoil and dovetail portions of the blade. It is contemplated that the blade be originally fabricated of a metallic material such as titanium or steel through known forging or casting techniques.

Blades of relatively low aspect ratio (blade span-to-chord ratio) such as depicted in FIG. 1 inherently incur plate deformation vibratory modes, or stripe modes. To illustrate the strip mode phenomenon, attention is directed to FIG. 2 wherein a rotor blade 18 having an airfoil portion 20 undergoing stripe mode resonance induced by the passing frequency of an upstream stator (not shown) is illustrated in somewhat exaggerated form. Essentially, in the high frequency stripe mode the blade is caused to vibrate with locally induced stress and deformation, the location being at the tip extremity of the blade and the characteristic shape being predominantly in chordwise bending. Referring now to FIG. 3 which represents a cross-sectional view of airfoil portion 20 taken at the blade tip, the dotted line 22 represents the locus of the blade mean camber line at a given instant in time. Line 24 represents the undeformed mean camber line and its intersections 26, 28 and 30 with the deformed means camber line 22 are referred to as nodal points. Essentially, these are points of zero airfoil section displacement in the vibratory mode. The locus of these nodal points along the span appears as nodal lines 26, 28 and 30 in FIG. 2. Thus, it can be seen that deformation, and therefore stress, is predominantly limited to the outer portion of the blade and particularly to the blade tip corners as manifested by nodal lines 26 and 30. Furthermore, the example of FIGS. 2 and 3 may be characterized as a three-stripe mode due to the existence of the three distinct nodal lines. It is to be noted that as the blade rotational speed is modulated, the nodal patterns change, and a typical fan or compressor blade experiences a plurality of patterns throughout its operating range. FIGS. 2 and 3 are merely representative of one possible pattern at one possible speed.

FIG. 4 may be recognized as a Campbell diagram for a blade such as that of FIGS. 2 and 3 wherein the ordinate represents blade vibratory frequency and the abscissa represents rotor blade rotational speed in rpm. The solid horizontal lines represent natural high frequency resonance modes as indicated, the stripe modes of the blade in question. Notice that there can be more than one three-stripe mode, for instance, since the nodal lines can assume various characteristic shapes within the airfoil. FIG. 4 depicts three such three-stripe modes by way of example, along with a two-stripe and a four-stripe mode. The diagonal line 32 represents the locus of points for a given number of blade excitations per revolution (such as generated by wakes from an equivalent number of vanes positioned upstream) as a function of blade rotational speed. In other words, line 32 is characterized by the relationship:

Frequency (cycles per sec.) = $XN/60$ where
$X$ = number of excitations per revolution; and,
$N$ = rotational speed, rpm.

Where line 32 crosses the horizontal high frequency stripe mode lines, the vibratory modes can become significant, as the intersections $a$ through $e$ constitute the blade resonant points. However, though the Campbell diagram for a particular blade can be generated by known techniques prior to running the blade as a portion of a complete engine compressor or fan, there is no consistent way of determining which, if any, of the resonant points would generate significant blade stresses, though it may generally be stated that the most severe conditions appear to occur at the higher rotational speeds. Once the machine is run with blades appropriately strain gaged, those resonant points which yield significant stresses can be determined. Heretofore, the remedy involved substituting a new upstream blade row with a different number of blades to change the number of blade wake excitations per revolution, increasing the thickness of the troubled blades to increase their frequency margin, or cropping the tip corners of the troubled blades to temporarily control the fatique-limiting stripe mode until a more permanent solution could be incorporated. Such modifications, while effective, were costly, and often delayed engine development. The invention now to be described offers an improved, low cost, rapid method of eliminating stripe mode vibratory problems from such blades.

Composite materials have long been recognized for their generally unidirectional high strength characteristics and have been used to reinforce or strengthen non-composite structures. By the term "composite" it is meant to embrace those materials wherein high strength, elongated, small diameter filaments having high strength and high modulus of elasticity are embedded in a lightweight matrix. In one embodiment, the primary structure involves graphite or boron filaments embedded in a matrix within the range of hydrocarbon materials such as epoxy resins. However, it is recognized that the term "composites" anticipates the use of any fiber embedded in any binder, such as an organic resin, for its primary structure. Furthermore, newly developed metal matrix materials allow better load transfer between the reinforcing filaments and a metallic parent structure since the metal matrix materials (such as titanium or aluminum) can be diffusion bonded to a parent metallic material. In the case of metallic compressor blades, the parent material may be titanium. Diffusion bonding is a process whereby the adjacent materials are combined molecularly under controlled conditions of elevated pressure and temperature.

The present invention involves the substitution of a portion of the metallic airfoil portion 12 of blade 10 (FIG. 1) with a composite patch 36, the substitution being performed in a unique manner to eliminate the stripe mode problem. The substitution of a composite material for the generally metallic parent material of the blade will produce an increase in airfoil natural mode frequency if properly incorporated. This is achieved by increasing chordwise bending stiffness so as to effect the deformation shape of the blade shown in FIGS. 2 and 3.

Blade frequency can generally be expressed by the relationship:

$$\text{Frequency} = f[\sqrt{EI/\rho}]$$

where $E$ = modulus of elasticity;
$I$ = moment of inertia of the material cross section; and,
$\rho$ = material density.

Substitution of composite materials for metallic parent metals increases the EI term due to the extremely high modulus of elasticity of the composite materials (composite filament moduli range from 40 to 60 × 10$^6$ psi as compared to titanium at 16 × 10$^6$ psi). Additionally, frequency is further increased by the substitution of a material of a lighter density for that of the parent material. This is the unique advantage of composite materials — the modulus of elasticity is high and density is low, thus tending to increase frequency in a cumulative fashion.

However, mere substitution of materials alone is not sufficient to eliminate the stripe mode resonant problem. Rather, the material substitution must be made in a particular manner. Unlike the fundamental bending and torsion vibratory modes, stripe mode frequency improvement can be effected with very limited quantities of composite material substitution due to the concentrated area affected by the stripe mode. In particular, the substitution comprises a patch 36 located only at the tip extremity of the airfoil 12 as shown in FIG. 1 since, as has been discussed, this is the primary region of increased stress in the stripe modes. As used herein, the tip extremity is deemed to be the outer 20 — 30 percent of the blade span. The filament orientation within the composite materials is in the generally chordwise direction for optimum chordwise stiffening. Furthermore, the chordwise extent of the patch must be sufficient to cover the nodal points of the particular nodal pattern causing concern. In order words, in the blade of FIGS. 2 and 3, the chordwise extent X of any contemplated composite reinforcement should embrace nodal lines 26, 28 and 30 of the pattern shown and, in some cases, may extend from the leading to the trailing edge of the blade. However, in most cases it would not be desirable to extend the composite patch all the way from the blade leading to the blade trailing edge since the parent metal is better able to withstand the effects of erosion and foreign object impact than is the composite material. Furthermore, there is no chordwise stress or strain at the free edges. Therefore, there is no need for reinforcement. Such a configuration, then, is in direct contrast to contemplated composite reinforcement for low frequency modes where extensive material substitution over large areas of the blade, particularly the blade root, is required and wherein the optimum filament orientation is in the spanwise or near-spanwise direction.

The incorporation of such a composite patch effectively raises the airfoil natural frequency from 10-30 percent, depending upon the amount of material substituted. As depicted in FIG. 4, the new natural frequency for the highest three-stripe mode is represented as the horizontal dashed line and the new resonant point as $d'$. Clearly the new resonance point occurs at a higher blade speed, and this point could be moved to a speed outside the operational range of engine speeds. Thus, the stress problem is resolved by prevention of resonance occurrence.

FIG. 5 is an enlarged, exploded view of the tip of the airfoil of FIG. 1 depicting the composite patches 36 in greater detail. Once it has been determined that a stripe mode problem exists and what the nodal pattern is, the extent of the patch can be determined. Preferably, the airfoil portion is mechanically or electromechanically machined to form a contoured pocket 38 for receipt of a similarly contoured patch 36. In the blade of FIG. 5, the airfoil portion has been machined on both sides so as to form a pair of pockets separated by a web 40 of the parent material which serves to structurally connect the blade leading and trailing edges 42 and 44, respectively. The patches 36 may be prefabricated by laminating and bonding together plies of composite material, typically thin sheets of parallel filaments sandwiched between sheets of a matrix material. The laminated patches may be machined to fit the pocket 38 and, if the matrix material is metallic, the patch metallurgically bonded to the parent metal of the airfoil. The well-known diffusion bonding technique is preferred. Since the patches are always located at the tip, temporary prolongations of the patches can be incorporated which extend past the tip of the blade and which permit mechanical fixturing and clamping to facilitate pressure bonding. After the blade is complete, these prolongations can be removed by machining without affecting the integrity of the blade. This avoids a more costly and time-consuming technique whereby the individual plies are individually tack welded and pressure bonded to the parent metal in a stacked relationship to build up a patch of appropriate thickness.

Alternative embodiments of the present invention are shown in FIGS. 6 and 7. In FIG. 6, the composite patch 36 does not extend all the way to the tip, leaving a portion 46 of rib 40 to function as a "squealer" tip. Since the tip cross-sectional area is significantly reduced, any tangential bending loads imposed on the blade due to rubbing against a circumscribing shroud are reduced. FIG. 7 shows the flexibility of the present inventive concept. Therein, an embodiment is depicted wherein the aft portion of airfoil 12 is replaced with a composite cap 50. The airfoil is machined along line 52 leaving optional tang 54 of the parent material extending radially from the remaining airfoil portion to provide additional surface area upon which the composite cap 50 may be bonded. Alternatively, the male and female roles of the airfoil 12 and cap 50 could be reversed by providing a recess within the airfoil within which a portion of the cap 50 could be captured and bonded.

Thus, an improved method for eliminating the stripe mode problem has been presented. In practice, the method includes designing a metallic blade for use in a turbomachine and testing the blade by known techniques to determine whether any limiting stripe mode resonances are present. If so, the nodal points are determined and a portion of the metallic airfoil at the tip removed, the removed portion always including the location of the objectionable nodal points. A patch of composite material is then substituted for the removed material with the filament orientation being in the generally chordwise direction.

It should become obvious to one skilled in the art that certain changes can be made to the above-described invention without departing from the broad inventive concepts thereof. For example, numerous other methods of attaching the composite reinforcement to the parent metal airfoil are possible such as by drilling a hole through the rib portion 40 (FIG. 5) and then bonding the two patches together through the hole, thereby sandwiching the rib of parent material therebetween. Additionally, the composite material could be attached by a combination of dovetailing and bonding. Furthermore, while the descriptions herein have been directed primarily to rotating blades, it is clear that the structure and method are equally applicable to nonrotating structures such as stator blades and vanes. Also, the entire airfoil could be cladded with a metallic sheet to protect the composite patch from the effects of erosion and to further retain the patch in its respective cavity. It is intended that the appended claims cover these and all other variations in the present invention's broader inventive concepts.

Having thus described the invention, what is claimed as novel and desired to be secured by Letters Patent of the United States is:

1. A method of fabricating a turbomachinery blade which avoids objectionable stripe mode resonance comprising the steps of:
    fabricating a turbomachinery blade out of a metallic parent material, the blade having an airfoil portion and a root portion;
    running the blade in the turbomachine;
    measuring the stress levels within the blade over the operational range of turbomachinery rotational speeds;
    selecting a speed which produces an objectionable stripe mode stress level;
    determining the nodal pattern for the selected speed; and
    substituting a filament composite material for the parent material at the airfoil tip wherein the chordwise extent of the composite material includes the nodal points for the selected speed and the composite filament orientation is substantially chordwise.

2. The method of claim 1 including the further steps of:
    eliminating a portion of one side of the airfoil at its tip so as to create a cavity;
    fabricating a composite patch of substantially the same contour as the cavity;
    inserting the patch within the cavity; and
    bonding the patch to the parent metal.

3. The method of claim 1 including the further steps of:
    eliminating portions of the airfoil on opposed sides thereof at the tip so as to create a pair of cavities separated by a web of parent metal;
    fabricating a pair of composite patches, each contoured to fit one of said cavities; and
    inserting the patches within their respective cavities and bonding the patches to the parent metal.

4. The method of claim 2 including the further steps of:
    fabricating the composite patch with a prolongation beyond the parent metal portion of the airfoil;
    fixturing the composite patch with respect to the parent metal airfoil portion through the prolongation; and
    removing the prolongation after the patch is bonded to the parent metal.

5. The method of claim 3 wherein the radial dimension of the patches is less than the radial dimension of the cavities, thereby leaving a portion of the rib exposed at the blade tip.

6. In a method of fabricating a turbomachinery blade, the steps of:
    determining the nodal pattern for an objectionable stripe mode resonance condition of a metallic blade;
    substituting a composite material, comprising elongated filaments embedded in a matrix material, for the parent metal blade material at the blade tip wherein the chordwise extent of the composite material includes the nodal points at the objectionable stripe mode resonance condition and the filament orientation is substantially chordwise.

7. A fluid flow turbomachine comprising a first blade row which produces aerodynamic fluid fluctuations which are felt by a second axially displaced blade row and wherein the second blade row includes airfoils fabricated of a parent metal everywhere along their span except at the tip which comprises a composite material having elongated filaments embedded in a matrix, the composite material extending chordwise along a surface of the airfoil from a point rearward of the airfoil leading edge to a point forward of the airfoil trailing edge, and wherein all of the filaments extend in the substantially chordwise direction.

8. A fluid flow turbomachine comprising a first blade row which produces aerodynamic fluid fluctuations which are felt by a second axially displaced blade row, and wherein the second blade row includes an airfoil fabricated of a parent metal everywhere along its span except at the tip which includes a patch of composite material having elongated filaments embedded in a matrix, the composite material being bonded to the parent metal and extending chordwise along a surface of the airfoil over the objectionable stripe mode nodal points of a geometrically similar blade fabricated entirely of the parent metal and experiencing the same aerodynamic fluid fluctuations, and wherein the filament orientation is substantially in the chordwise direction.

9. The invention as recited in claim 8 wherein the composite patch is disposed in a cavity formed within one of the airfoil aerodynamic surfaces.

10. The invention as recited in claim 9 wherein the airfoil includes a pair of composite patches, one bonded within each of a pair of cavities formed within opposing airfoil aerodynamic surfaces, said cavities being separated by a web of parent metal and extending chordwise over the objectionable stripe mode nodal points of a geometrically similar blade fabricated entirely of the parent metal which experiences the same aerodynamic fluctuations, and wherein the filament orientatin of both patches is substantially in the chordwise direction.

11. The invention as recited in claim 9 wherein the matrix material is a metal.

12. The invention as recited in claim 11 wherein the matrix material is the same as the parent material.

13. In a method of eliminating an objectionable stripe mode resonance condition in a blade fabricated primarily of a parent metal, the step of raising the natural frequency of the blade in the stripe mode by reinforcing the metallic blade at the tip with a patch of composite material which includes elongated filaments embedded in a matrix bonded to the parent metal, the filament orientation being substantially chordwise and the patch extending chordwise over the objectionable stripe mode nodal points of a geometrically similar blade fabricated entirely of the parent metal.

* * * * *